United States Patent
Choe et al.

(10) Patent No.: US 7,827,545 B2
(45) Date of Patent: Nov. 2, 2010

(54) DYNAMIC REMEDIATION OF A CLIENT COMPUTER SEEKING ACCESS TO A NETWORK WITH A QUARANTINE ENFORCEMENT POLICY

(75) Inventors: Calvin Choon-Hwan Choe, Redmond, WA (US); Misty Louise Pickford, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 978 days.

(21) Appl. No.: 11/304,420

(22) Filed: Dec. 15, 2005

(65) Prior Publication Data
US 2007/0143392 A1   Jun. 21, 2007

(51) Int. Cl.
  *G06F 9/44*   (2006.01)
(52) U.S. Cl. .................................. 717/168; 717/173
(58) Field of Classification Search ......... 717/168–178, 717/173
See application file for complete search history.

(56) References Cited

U.S. PATENT DOCUMENTS

| | | | |
|---|---|---|---|
| 5,659,616 A | 8/1997 | Sudia | |
| 6,023,586 A | 2/2000 | Gaisford et al. | |
| 6,035,423 A * | 3/2000 | Hodges et al. | 714/38 |
| 6,088,451 A | 7/2000 | He et al. | |
| 6,134,680 A | 10/2000 | Yeomans | |
| 6,154,776 A | 11/2000 | Martin | |
| 6,233,577 B1 | 5/2001 | Ramasubramani et al. | |
| 6,233,616 B1 | 5/2001 | Reid | |
| 6,275,941 B1 | 8/2001 | Saito et al. | |
| 6,301,613 B1 | 10/2001 | Ahlstrom et al. | |
| 6,321,339 B1 | 11/2001 | French et al. | |
| 6,327,550 B1 | 12/2001 | Vinberg et al. | |
| 6,389,539 B1 | 5/2002 | Hamilton, II et al. | |
| 6,393,484 B1 | 5/2002 | Massarani | |
| 6,553,493 B1 | 4/2003 | Okumura et al. | |
| 6,564,320 B1 | 5/2003 | de Silva et al. | |

(Continued)

FOREIGN PATENT DOCUMENTS

WO   WO 2004/002062 A1   12/2003

(Continued)

OTHER PUBLICATIONS

"AAA: from RADIUS to Diameter," 10 pages (Sep. 18, 2003).

(Continued)

*Primary Examiner*—Wei Y Zhen
*Assistant Examiner*—Phillip H Nguyen

(57) ABSTRACT

A network in which remediation is provided to keep protective software in network clients up-to-date. As network clients connect to an access control server, the clients provide status information concerning their protective software. The access server determines whether the clients comply with a quarantine enforcement policy. Clients that comply with the policy are granted access to the network. Those that do not comply with the quarantine enforcement policy are either denied access or given limited access to the network for purposes of remediation. When the access control server denies access to a client, it determines remediation steps required to bring the client into compliance with the quarantine enforcement policy. This remediation information is communicated to the client to facilitate remediation of the client on either an automated or a manual basis. The remediation information may be communicated in the form of an address from which the client may obtain software updates, executable software, human-usable information or both remediation information.

20 Claims, 6 Drawing Sheets

U.S. PATENT DOCUMENTS

| | | | |
|---|---|---|---|
| 6,601,175 B1 | 7/2003 | Arnold et al. | |
| 6,611,869 B1 | 8/2003 | Eschelbeck et al. | |
| 6,615,383 B1 | 9/2003 | Talluri et al. | |
| 6,754,664 B1 | 6/2004 | Bush | |
| 6,847,609 B1 | 1/2005 | Sarnikowski et al. | |
| 6,854,056 B1 | 2/2005 | Benantar et al. | |
| 6,871,284 B2 | 3/2005 | Cooper et al. | |
| 6,873,988 B2* | 3/2005 | Herrmann et al. | 707/10 |
| 6,892,317 B1 | 5/2005 | Sampath et al. | |
| 6,966,059 B1* | 11/2005 | Shetty et al. | 717/172 |
| 6,993,686 B1 | 1/2006 | Groenendaal et al. | |
| 7,010,807 B1* | 3/2006 | Yanovsky | 726/24 |
| 7,020,532 B2 | 3/2006 | Johnson et al. | |
| 7,032,022 B1 | 4/2006 | Shanumgam et al. | |
| 7,039,807 B2 | 5/2006 | Spitz | |
| 7,046,647 B2 | 5/2006 | Oba et al. | |
| 7,249,187 B2* | 7/2007 | Sobel et al. | 709/229 |
| 7,315,890 B2* | 1/2008 | Tilton et al. | 709/223 |
| 7,383,579 B1* | 6/2008 | Catanzano | 726/24 |
| 7,526,792 B2* | 4/2009 | Ross | 726/2 |
| 7,539,862 B2* | 5/2009 | Edgett et al. | 713/168 |
| 2001/0047514 A1 | 11/2001 | Goto et al. | |
| 2002/0010800 A1 | 1/2002 | Riley et al. | |
| 2002/0073308 A1 | 6/2002 | Benantar | |
| 2002/0078347 A1 | 6/2002 | Hericourt et al. | |
| 2002/0129264 A1 | 9/2002 | Rowland et al. | |
| 2002/0144108 A1 | 10/2002 | Benantar | |
| 2002/0199116 A1 | 12/2002 | Hoene et al. | |
| 2003/0009752 A1 | 1/2003 | Gupta | |
| 2003/0014644 A1 | 1/2003 | Burns et al. | |
| 2003/0041167 A1 | 2/2003 | French et al. | |
| 2003/0044020 A1 | 3/2003 | Aboba et al. | |
| 2003/0055962 A1 | 3/2003 | Freund et al. | |
| 2003/0055994 A1* | 3/2003 | Herrmann et al. | 709/229 |
| 2003/0065919 A1 | 4/2003 | Albert et al. | |
| 2003/0087629 A1 | 5/2003 | Juitt et al. | |
| 2003/0097315 A1 | 5/2003 | Guerrero et al. | |
| 2003/0126136 A1 | 7/2003 | Omoigui | |
| 2003/0191966 A1 | 10/2003 | Gleichauf | |
| 2003/0200464 A1 | 10/2003 | Kidron | |
| 2003/0221002 A1 | 11/2003 | Srivastava et al. | |
| 2004/0006532 A1 | 1/2004 | Lawrence et al. | |
| 2004/0039580 A1 | 2/2004 | Steger | |
| 2004/0083129 A1 | 4/2004 | Herz | |
| 2004/0085944 A1 | 5/2004 | Boehm | |
| 2004/0107360 A1 | 6/2004 | Herrmann et al. | |
| 2004/0153171 A1 | 8/2004 | Brandt et al. | |
| 2004/0153823 A1 | 8/2004 | Ansari | |
| 2004/0167984 A1 | 8/2004 | Herrmann | |
| 2004/0249974 A1 | 12/2004 | Alkhatib et al. | |
| 2004/0250107 A1 | 12/2004 | Guo | |
| 2004/0268148 A1 | 12/2004 | Karjala et al. | |
| 2005/0015622 A1 | 1/2005 | Williams et al. | |
| 2005/0021733 A1 | 1/2005 | Clinton et al. | |
| 2005/0021975 A1 | 1/2005 | Liu | |
| 2005/0081111 A1 | 4/2005 | Morgan et al. | |
| 2005/0086337 A1 | 4/2005 | Quittek et al. | |
| 2005/0086502 A1 | 4/2005 | Rayes et al. | |
| 2005/0114502 A1 | 5/2005 | Raden et al. | |
| 2005/0131997 A1 | 6/2005 | Lewis et al. | |
| 2005/0138204 A1 | 6/2005 | Iyer et al. | |
| 2005/0144532 A1 | 6/2005 | Dombrowa et al. | |
| 2005/0165953 A1 | 7/2005 | Oba et al. | |
| 2005/0166197 A1 | 7/2005 | Riley | |
| 2005/0172019 A1 | 8/2005 | Williamson et al. | |
| 2005/0188285 A1 | 8/2005 | Fellenstein et al. | |
| 2005/0193386 A1 | 9/2005 | McCaleb et al. | |
| 2005/0198527 A1 | 9/2005 | Johnson et al. | |
| 2005/0254651 A1 | 11/2005 | Porozni et al. | |
| 2005/0256970 A1 | 11/2005 | Harrison et al. | |
| 2005/0267954 A1 | 12/2005 | Lewis et al. | |
| 2006/0002556 A1 | 1/2006 | Paul | |
| 2006/0004772 A1 | 1/2006 | Hagan et al. | |
| 2006/0033606 A1 | 2/2006 | Howarth et al. | |
| 2006/0036733 A1 | 2/2006 | Fujimoto et al. | |
| 2006/0075140 A1 | 4/2006 | Sobel et al. | |
| 2006/0085850 A1 | 4/2006 | Mayfield et al. | |
| 2006/0143440 A1 | 6/2006 | Ponnapalli et al. | |
| 2006/0164199 A1 | 7/2006 | Gilde et al. | |
| 2006/0184651 A1 | 8/2006 | Tirnumala | |
| 2006/0256730 A1 | 11/2006 | Compton | |
| 2007/0100850 A1 | 5/2007 | Choe et al. | |
| 2007/0127500 A1 | 6/2007 | Maeng | |
| 2007/0150934 A1 | 6/2007 | Fiszman et al. | |
| 2007/0198525 A1 | 8/2007 | Chatterjee et al. | |
| 2007/0234040 A1 | 10/2007 | Hurst et al. | |
| 2008/0005285 A1 | 1/2008 | Robinson | |
| 2009/0077631 A1 | 3/2009 | Keohane | |

FOREIGN PATENT DOCUMENTS

| | | | |
|---|---|---|---|
| WO | WO 2004/042540 A2 | 5/2004 | |
| WO | WO 2004/046953 A1 | 6/2004 | |
| WO | WO 2005/040995 A2 | 5/2005 | |

OTHER PUBLICATIONS

"Cisco Network Admission Control and Microsoft Network Access Protection Interoperability Architecture," *Cisco Systems and Microsoft Corporation*, http://www.cisco.com/en/US/netsol/ns466/networking_solutions_package.html, 8 pages (Published: Sep. 2006).

"Cryptographic Provider Names," http://msdn.microsoft.com/library/en-us/seccrypto/security/cryptographic_provider_name . . . , 1 page (Retrieved Oct. 10, 2006).

"Cryptography," http://msdn.microsoft.com/library/en-us/seccrypto/security/cryptography_portal.asp?frame=true, 2 pages (Retrieved Oct. 12, 2006).

"IPsec," http://www.microsoft.com/technet/itsolutions/network/ipsec/default.mspx, 4 pages (Retrieved Oct. 10, 2006).

"Lockdown Networks Unveils Switch-Level Network Access Control," *IT Observer*, http://www.ebcvg.com/press.php?id=1643, 4 pages (Sep. 13, 2005).

"Network Access Protection," http://www.microsoft.com/technet/itsolutions/network/nap/default.mspx, 4 pages (Retrieved Oct. 10, 2006).

"TPM Work Group," *Trusted Computing Group*, https://www.trustedcomputinggroup.org/groups/tpm/, 1 page (Retrieved Oct. 10, 2006).

"Windows Resource Protection," http://msdn.microsoft.com/library/en-us/wfp/setup/windows_file_protection_start_page.asp?fram, 1 page (Retrieved Oct. 12, 2006).

Bechler, M. et al., "A Cluster-Based Security Architecture for Ad Hoc Networks," *IEEE Infocom 2004*, 11 pages (Mar. 7-11, 2004).

Chong, F. et al., "Web Service Health Modeling, Instrumentation, and Monitoring: Developing and Using a Web Services Health Model for the Northern Electronics Scenario," http://msdn.microsoft.com/library/en-us/dnbda/html/MSArcSeriesMCS6.asp?frame=true, 36 pages (Sep. 2005).

Cisco Systems, "Cisco Clean Access Manager Installation and Administration Guide," Release 3.5, pp. 1-62 (Jan. 2006).

Cisco Systems, "Cisco Clean Access: In-Band and Out-Of-Band Deployment Options and Considerations," White Paper, pp. 1-8 (2003).

Cisco Systems, "Cisco Clean Access: A Network Admissions Control Appliance," http://www.cisco.com/en/US/products/ps6128/products_data_sheet0900aecd802da1b5.html, 6 pages (Retrieved Sep. 26, 2005).

Cisco Systems, "Securing Complexity with NAC Appliance (Cisco Clean Access): A Technical View," *NAC Appliance Technical Marketing Team*, pp. 1-41 (Jun. 2006).

Conry-Murray, A., "Cisco NAC vs. Microsoft NAP," http://www.itarchitectmag.com/shared/article/show/Article.jhtml;jsessionid=NFZ3V0ACPV5KQSNDLPCKHSCJUN, 4 pages (Mar. 1, 2005).

Droms, R. et al., "Dyanmic Host Configuration Protocol for IPv6 (DHCPv6)," RFC 3315, 100 pages (Jul. 2003).

F5 Networks, "Best-In-Class Enterprise SSL VPN," 6 pages (Copyright 2005).

Jaganathan, K., et al..,"SPNEGO-based Kerberos and NTLM HTTP Authentication in Microsoft Windows," RFC 4559, http://www.ietf.org/rfc/rfc4559.txt, 8 pages (Jun. 2006).

Jansen, W. et al., "Policy Expression and Enforcement for Handheld Devices," 23 pages (Apr. 2003).

Johnston, W. et al., "Authorization and Attribute Certificates for Widely Distributed Access Control," *IEEE 7th International Workshops on Enabling Technologies: Infrastructure for Collaborative Enterprises—WETICE* '98, pp. 1-6 (Jun. 17-19, 1998).

Jonsson, J. et al., "Public-Key Cryptography Standards (PKCS) #1: RSA Cryptography Specifications Version 2.1", RFC 3447, 64 pages (Feb. 2003).

Liu, X. et al., "Cisco Systems' Simple Certificate Enrollment Protocol (SCEP)," http://ietfreport.isoc.org/all-ids/draft-nourse-scep-01.txt, 37 pages (Jan. 2000).

Microsoft Corporation, "Microsoft Windows Server 2003 Network Access Quarantine Control," 35 pages (Published: Mar. 2003; Updated: Oct. 2003).

Microsoft Corporation, Microsoft Windows Server System, Internet Protocol Security Quarantine in the Network Access Protection Platform, http://www.microsoft.com/technet/itsolutions/network/nap/napipsec.mspx, 31 pages (Published: Jul. 27, 2005; Updated: Oct. 14, 2005).

Microsoft Corporation, Microsoft Windows Server System, Introduction to Network Access Protection, http://www.microsoft.com/technet/itsolutions/network/nap/napoverview.mspx, 18 pages (Published: Jul. 13, 2004; Updated: Jul. 27, 2005).

Microsoft Corporation, Microsoft Windows Server System, Network Access Protection Platform Architecture, http://www.microsoft.com/technet/itsolutions/network/nap/naparch.mspx, 36 pages (Published: Jul. 13, 2004; Updated: Oct. 14, 2005).

Microsoft Releases Windows Server 2003 Service Pack 1, http://www.microsoft.com/presspass/press/2005/mar05/03-30winservsp1pr.mspx, 4 pages (Retrieved Sep. 26, 2005).

Murphy, T., "The cdma2000 packet core network," *Ericsson Review*, No. 2, pp. 88-95 (2001).

Network Access Protection, Microsoft Corporation, 7 pages (Jun. 25, 2007).

New Trusted Computing Group Formed to Advance the Adoption of Open Standards for Trusted Computing Technologies, https://www.trustedcomputinggroup.org/news/press/tcg/2003/2003_04_08_tcg_formed.pdf, 2 pages (Apr. 8, 2003).

Rigney, C. et al., "Remote Authentication Dial in User Service (RADIUS)," RFC 2058, pp. 1-57 (Jan. 1997).

Rutishauser, U. et al., "Open reference implementation of a SCEP v2 client," pp. 1-35 (Mar. 1, 2002).

Scheifler, R., "X Window System Protocol, Version 11," RFC 1013, pp. 1-101 (Jun. 1987).

Sygate Secure Enterprise, Sygate Technologies, Inc., 4 pages (Copyright 2004).

TCG Trusted Network Connect TNC Architecture for Interoperability Specification Version 1.1, Revision 2, https://www.trustedcomputinggroup.org/specs/TNC/TNC_Architecture_v1_1_r2.pdf, 40 pages (May 1, 2006).

TCG Trusted Network Connect TNC Architecture for Interoperability Specification Version 1.2, Revision 4, https://www.trustedcomputinggroup.org/specs/TNC/TNC_Architecture_v1_2_r4.pdf, 41 pages (May 21, 2007).

TCG Trusted Network Connect TNC IF-TNCCS Specification Version 1.0, Revision 2, https://www.trustedcomputinggroup.org/specs/TNC/TNC_IF-TNCCS_v1_0_r2.pdf, 21 pages (May 1, 2006).

TCG Trusted Network Connect TNC Architecture for Interoperability Specification Version 1.0, Revision 4, 39 pages (May 3, 2005).

Thompson, J. et al., "A Secure Public Network Access Mechanism," *UNIX Security Symposium III Proceedings*, 13 pages (Sep. 14-16, 1992).

Thompson, M. et al. "Certificate-Based Authorization Policy in a PKI Environment," *ACM Transactions on Information and System Security*, vol. 6, No. 4, pp. 566-588 (Nov. 2003).

Thurm, S., "Cisco Acts to Take Greater Role in Virus Protection of Networks," *The Wall Street Journal*, 2 pages (Nov. 19, 2003).

White, D. et al., "NAC Solution and Technology Overview," *Cisco Network Admission Control*, vol. II: NAC Deployment and Troubleshooting, 6 pages (Jan. 19, 2007).

Wikipedia, "X Window System," http://en.wikipedia.org/wiki/X_Window_System, pp. 1-15 (Retrieved Mar. 4, 2007).

Zorn, G., "Microsoft Vendor-specific RADIUS Attributes," RFC 2548, pp. 1-37 (Mar. 1999).

"The Cable Guy—Jul. 2005: Network Access Protection Platform Overview," Published: Jun. 29, 2005; Updated: May 23, 2006; [8 pages].

Pearce, Craig; Bertok, Peter; Thevathyan, Charles. "A Protocol for Secrecy and Authentication within Proxy-Based SPKI/SDSI Mobile," School of Computer Science and Information Technology, RMIT University, 2004, pp. 1-14.

Persiano, Pino; Visconti, Ivan, "A secure and private system for subscription-based remote services," Universita di Salerno, Nov. 2003, [29 pages].

Mockapetris, P., "Domain names—Implementation and Specificaton", RFC1035, Nov. 1987, http://www.ieft.org/rfc/rfc1035.txt.

Bradner, S., "Key words for use in RFCs to Indicate Requirement Levels", RFC 2119, Mar. 1997, http://www.ietf.org/rfc/rfc2119.txt.

Hoffman, P., "UTF-16, and encoding of ISO 10646", RFC 2781, Feb. 2000, http://www.ietf.org/rfc/rfc2781.txt.

Windows Server 2008 Data Sheet; Customer Datasheet; Apr. 17, 2009; 13 pages http://74.125.77.132/search?q=cache:AaDWGq-dCOcJ:www.solutiondemo.net/ws08hda/Market/Window%2520Server%25202008%2520Datasheet.doc+dynamically+providing+a+URL+to+unhealthy+machines+for+remediation&cd=2&hl=en&ct=clnk.

Microsoft TechNet; About Network Access Protection Remediation; Apr. 17, 2009; 2 pages http://technet.microsoft.com/en-us/library/bb633268.aspx.

\* cited by examiner

DYNAMIC REMEDIATION OF A CLIENT COMPUTER SEEKING ACCESS TO A NETWORK WITH A QUARANTINE ENFORCEMENT POLICY

BACKGROUND

Maintaining the integrity of computer systems has become an increasingly important function as the role of computer systems in all aspects of modern life has expanded. Simultaneously, the threats to computer systems have grown. Networked computer systems are particularly vulnerable to threats posed by "viruses," "spyware" and "hackers" bent on stealing information or disrupting operation of the computer system.

One approach to increasing the integrity of networked computer systems is through the use of protective software. Each client to connect to the network is equipped with software that can detect and thwart threats to the networked computer system. Firewalls, antivirus software and antispyware software are examples of protective software that is widely used on network clients. A drawback of such protective software is that, to be fully effective, the software must be updated to address new threats as the threats are created.

To facilitate easy updates, protective software often includes data files holding descriptions of threats that the software can detect or prevent. These data files may be easily updated, such as by downloading from a server new files to describe new threats. Nonetheless, the operator of each client connected to a network must take action to keep the client up-to-date. An operator may take action explicitly, such as by periodically downloading new data files. Alternatively, the operator may configure the protective software to automatically download new data files. Sometimes, the operator does not properly update, operate or configure protective software, leaving vulnerabilities.

Vulnerabilities caused by improper use of protective software are sometimes addressed through a "quarantine" approach. Clients seeking to access a network may be denied access or "quarantined," if they do not have the most up-to-date protective software. A quarantined client may be given limited access to the network, sufficient to allow the computer to be "remediated," which means that the client downloads updates to the protective software from a server or corrective action is otherwise taken to resolve the problems that caused the client to be quarantined.

SUMMARY OF INVENTION

This invention relates to remediating clients seeking access to a network having a quarantine enforcement policy. A client denied access receives remediation information, which simplifies the remediation process.

In one aspect, a client denied access to a network operating according to a quarantine enforcement policy may receive an address of a server from which it may obtain information concerning remediation of the client. Specific examples of information concerning remediation include a web page in human readable form, a computer-executable script that can be executed to remediate the client, or software downloads to update the client. The request for access may include status information concerning the client, allowing a server moderating access to a network according to the quarantine enforcement policy to identify specific remediation steps required for the client and select the address that is sent to the client to provide information focused on the required remediation steps.

In another aspect, the invention relates to computer instructions that may be executed on a client computer. These instructions may control the client computer to ascertain its status and generate a request for access. Upon receiving a response, the client may undertake remediation action. The client may be configured to take at least one of multiple types of remediation action, based on information in the response. The remediation actions may include automatically obtaining updates, displaying information to a human user or obtaining a computer-executable script adapted to update the client.

In another aspect, a server moderating access to a network according to a quarantine enforcement policy receives status information concerning a client requesting access. The server determines whether the client complies with the quarantine enforcement policy and, if the client does not comply, identifies a reason. The server uses the identified reason to select an address of remediation information which is then sent to the client. By selecting an address for remediation information based on the status of the client, information specifically applicable to a client may be provided, allowing the remediation process to be quickly and easily performed in either an automatic, semi-automatic or manual fashion.

The foregoing is a non-limiting summary of the invention, which is defined by the attached claims.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

It would be desirable to increase the integrity of a networked computer system by increasing the ability of the system to remediate clients that pose a risk to the network because they do not contain or use the most up-to-date protective software. However, any increase in the level of protection should not unreasonably burden the network or network users and should be easily administered. As described below, an improved quarantine management system is provided in which an access control server provides remediation information to a quarantined client. The remediation information may be in the form of instructions to be followed by a human user, a location from which updates may be obtained or may alternatively or additionally contain computer-executable instructions adapted to remediate the client when the instructions are executed in an automated or semi-automated fashion.

As used herein, a quarantine enforcement policy refers to an embodiment of the logic used to determine whether a client may be given access to a network based on the status of software on the client (also referred to as client "health"). The policy may be stored in a data structure as a set of criteria or rules that must be satisfied for a client to be granted network access. However, any suitable method of defining a quarantine enforcement policy may be used. Further, a quarantine enforcement policy may be just one part of a larger access control policy. Accordingly, reference to a grant or denial of network access based on the quarantine enforcement policy does not preclude the possibility that the client will be denied or granted access for other reasons.

Figure 1:
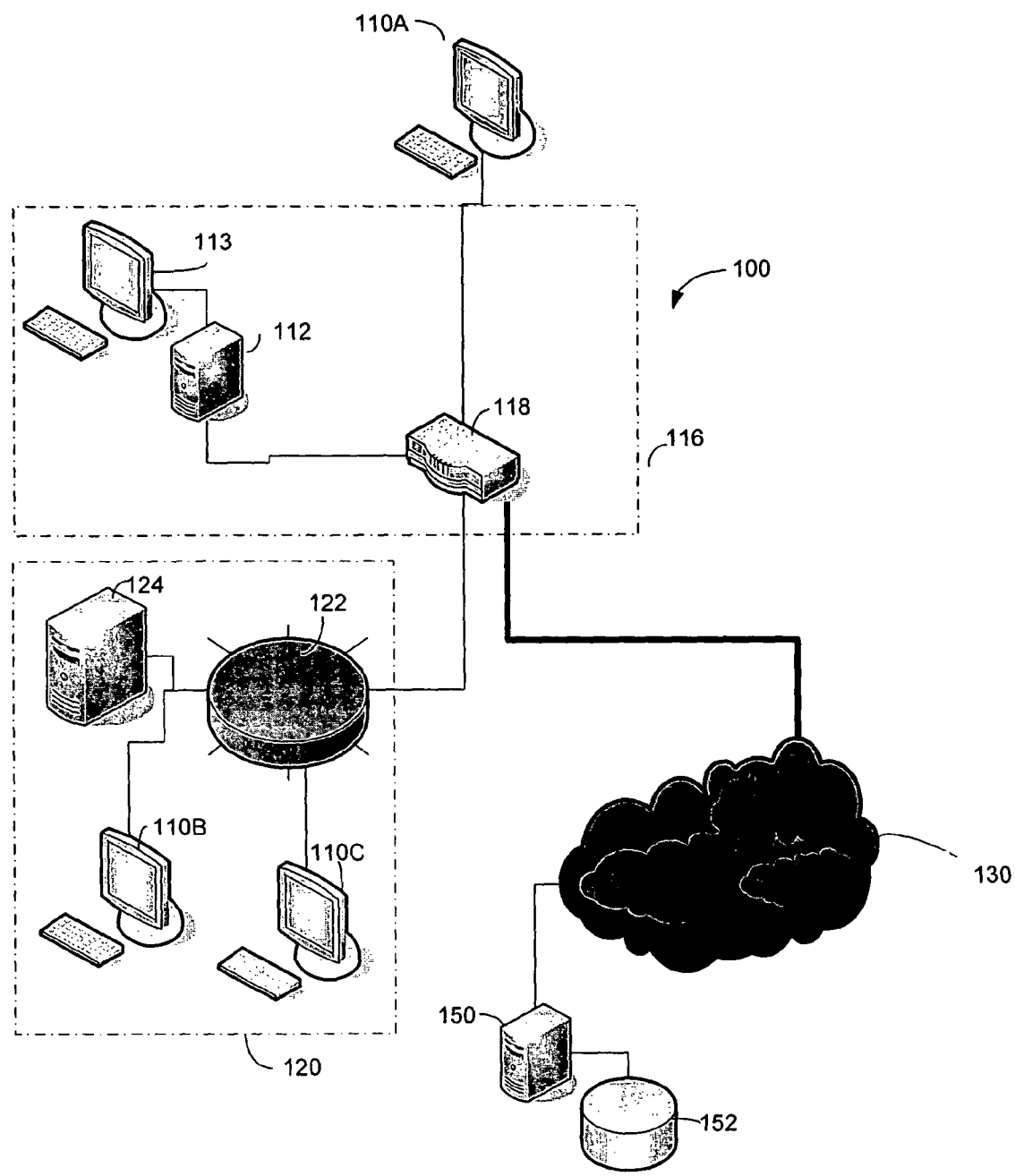
FIG. 1 is sketch of a network according to an embodiment of the invention.

FIG. 1 shows a sketch of a computer system 100, which may be constructed from devices as are used in conventional computer systems. However, computer system 100 differs from a conventional computer system in that devices within computer system 100 are programmed to implement an improved quarantine management system in which remediation information is provided to a client that is quarantined.

Computer system 100 includes a managed network 120. In this example, managed network 120 may be a network within a company or enterprise. Alternatively, managed network 120 may be a domain or other portion of a larger network. Managed network 120 is managed by an individual or entity that provides access policies for the network. A person or entity who provides these network management functions is referred to generally as "a network administrator." In a networked computer system, there may be multiple people or entities providing network management functions, any or all of which may be generally referred to as a network administrator.

As shown in FIG. 1, managed network 120 includes network devices such as server 124 and clients 110B and 110C. Here a wide area network (WAN) 122 is shown interconnecting the network devices. This configuration is shown for simplicity of illustration. A managed network may contain more devices than illustrated in FIG. 1. Likewise, a single WAN 122 is shown as an example of the interconnection architecture of managed network 120, but a managed network may contain different or additional interconnection architectures.

Devices may connect to managed network 120 through access point 116. Each of the clients 110B and 110C within managed network 120 may similarly be connected through access point 116 or other similar access point. The example of FIG. 1 shows that client 110B and 110C have already been given access to managed network 120. Therefore, their connection through an access point is not expressly shown.

FIG. 1 shows client 110A seeking to connect to managed network 120 through access point 116. Access point 116 may be a wireless access point, hard wired access point or any other type of access point, whether now known or hereafter developed. In the example of FIG. 1, access point 116 includes a switching device 118 and a server 112.

Switching device 118 represents any of a number of types of switching devices that may be incorporated into an access point. Switching device 118 may be a device such as a router, switch, hub, gateway, or any other suitable switching device.

In operation, server 112 acts as an access control server. As a client, such as client 110A, seeks access to managed network 120, server 112 determines whether client 110A should be given access to managed network 120. Server 112 is programmed to grant or deny network access in accordance with a quarantine enforcement policy. Server 112A may be a server as is conventionally referred to as a "RADIUS" server, an "IAS" server, an "AAA" server or a level 2 access control server. However, any suitably programmed server may be used.

Access point 116 is here shown to alternatively or additionally allow client 110A to connect to networks or devices outside of managed network 120 even if denied access to managed network 120 (i.e., the client is "quarantined"). In the embodiment illustrated in FIG. 1, switching device 118 may allow client 110A to access the Internet 130. Through Internet 130, client 110A may reach devices such as server 150.

Server 150 acts as an update server. In the embodiment illustrated, server 150 is coupled to database 152. Database 152 may contain software updates for software executing on client 110A. Updates stored in database 152 may include updates to antivirus software, antispyware software or other software that may alter the "health" of client 110A. If client 110A is denied access to managed network 120 because its protective software is out-of-date, client 110A may nonetheless connect to update server 150 to obtain updates to its protective software.

Database 152 may contain software updates in the form of data files that may be downloaded to operate with protective software on client 110A. For example, data files that contain virus signatures or other threat signatures may be downloaded for use in conjunction with antivirus or antispyware programs. Alternatively, database 152 may contain patches for protective software executing on client 110A. A patch is a representation of updated software, usually in compressed form and often created by encoding differences between one version of a software program and a later version.

Further, database 152 may contain patches for operating system or other general purpose software executing on client 110A. Though operating system software is not generally regarded as protective software, the status of operating system software may have a large impact on the health of client computer 110A. For example, hackers may try to discover and exploit weaknesses in operating system software. In response, as vulnerabilities in general purpose software are identified, software vendors may issue patches or other updates that modify the software to remove those vulnerabilities. Therefore, the extent to which a client has installed patches, particularly patches directed to removing vulnerabilities, may be regarded as an indication of the health of a client. In some embodiments, access server 112 is programmed to implement a quarantine enforcement policy in which access to managed network 120 is granted or denied based, at least in part, on whether patches directed to vulnerabilities in general purpose software have been installed on the client.

Client 110A may access software updates from update server 150 in response to commands from a user operating client 110A. Alternatively, client 110A may be programmed to automatically access update server 150 in response to being denied access to managed network 120. In this way, a client that lacks sufficient health to be admitted to managed network 120 may nonetheless be "remediated" so that it qualifies for access to managed network 120.

In some instances, a client seeking access to managed network 120 may lack the programming to automatically connect to update server 150. Alternatively, update server 150 may not contain the updates needed to remediate a specific client that has been quarantined. Further, merely being denied access to managed network 120 may not provide client 110A with sufficient information to identify updates that need to be downloaded from update server 150. Furthermore, client 110A may be quarantined for reasons other than because the client lacks a required update. For example, client 110A may be quarantined because, though it has up-to-date protective software, the protective software is misconfigured.

To facilitate the use of a strong quarantine enforcement policy without unreasonably burdening network users, access control server 112 may provide remediation information to client 110A when client 110A is quarantined.

In some instances, the remediation information may indicate that client 110A is to download updates from update server 150 in order to remediate. However, the remediation information may alternatively or additionally provide a more specific identification of steps needed for remediation of client 110A. The remediation information may include links to specific information needed by a quarantined client. For example, update server 150 may contain updates for multiple types of protective software. But, client 110A may need a single update. Accordingly, server 112 may, upon quarantining client 110A, provide client 110A with a specific URL of a page on update server 150 where the specific updates needed to remediate client 110A may be downloaded.

In some embodiments, different remediation information will be available from different servers. For example, FIG. 1 shows that managed network 120 includes policy server 124 in addition to update server 150. In this example, policy server 124 includes remediation information in the form of human-readable instructions. Policy server 124 may contain multiple pages, each with a different type of information addressing a different problem that could cause client 110A to be quarantined. Upon quarantining client 110A, access server 112 may provide client 110A with the URL of a page within policy server 124 that describes specific steps a human operator of client 110A should take to remediate client 110A.

Server 112 may, upon determining that client 110A should be quarantined, also identify the problem with client 110A that caused the client to be quarantined. By using information about the problem, server 112 may select an appropriate URL within policy server 124 containing information to address the specific problem that caused client 110A to be quarantined.

In the example illustrated in FIG. 1, policy server 124 is contained within managed network 120. Though client 110A may be quarantined, it may have limited access to managed network 120. In such an embodiment, access point 116 will allow client 110A to communicate with devices within managed network 120 only for remediation activities. If policy server 124 is established as a device with which quarantined clients may communicate, policy server 124 may provide remediation information to quarantined client 110A even though policy server 124 is within managed network 120.

More generally, remediation information may be provided from any suitable source that can be accessed by a quarantined client. As illustrated by FIG. 1, remediation information may come from devices completely outside of managed network 120. Alternatively, remediation information may be provided by devices within managed network 120. In some embodiments, remediation information may be provided by access control server 112. Regardless of this specific source of remediation information, server 112 may provide information to client 110A on how to access the remediation information. In the described embodiment, remediation information is communicated to client 110A by providing an address of where the remediation information may be obtained, but any suitable form of communicating the remediation information may be used.

In addition, the address of the remediation information may be provided in connection with a code or other indication of the type of information available at that address. The code may be used by client 110A to appropriately process the information available at that address. For example, an address specifying a patch may be used differently than an address specifying human-readable information.

Figure 2:
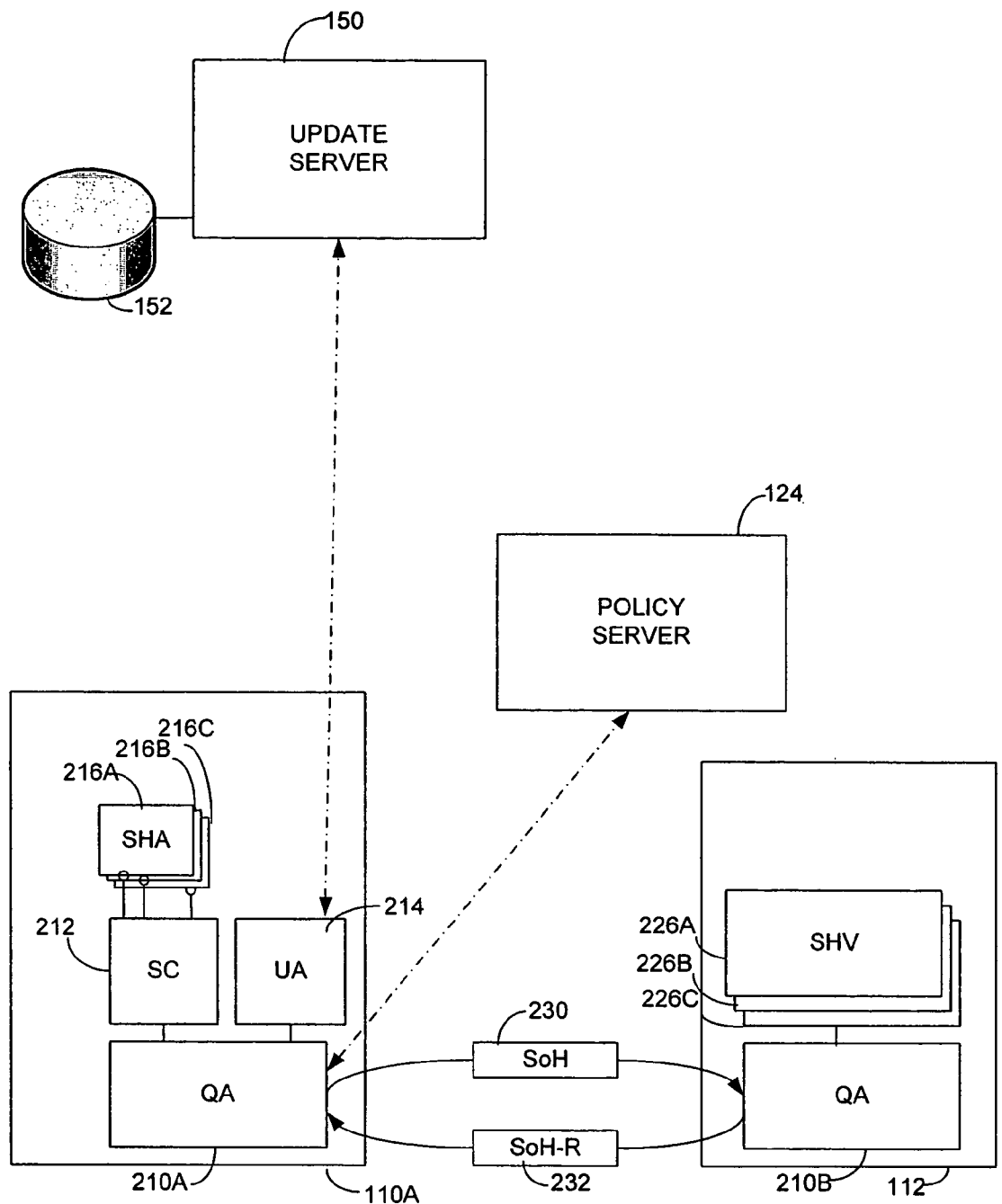
FIG. 2 is a software block diagram of software implementing a quarantine enforcement policy in the network of FIG. 1.

Turning to FIG. 2, a block diagram of software within client 110A and access server 112 is shown. In the illustrated embodiment, the software is implemented as multiple components. Each component may be implemented as multiple computer-executable instructions stored in a computer-readable medium accessible to a computing device. The components may be implemented in any suitable language and may run on any suitable computing device. Conventional programming techniques may be used to implement the functions described in greater detail herein.

The software represented by FIG. 2 controls the devices in the network to operate in accordance with a quarantine enforcement policy, which may be specified by a network administrator. The update status of protective software on client 110A is, in the given example, at least one factor considered in determining whether a client warrants access to the network in accordance with the policy. If access server 112 determines that the update status of software within client 110A does not comply with the quarantine enforcement policy, server 112 will deny network access to client 110A. Client 110A may then download update information to bring itself into compliance with the quarantine enforcement policy. To obtain update information, client 110A includes update agent 214.

Update agent 214 is a software component that accesses an update server, such as update server 150, to obtain and install patches or other updates for protective software within client 110A. The specific address from which update information is obtained may be specified by server 112 as part of a denial of access to client 110A.

Update agent 214 may run at times other than in response to client 110A being denied access to managed network 120. Update agent 214 may, for example, periodically prompt a user of client 110A for permission to access update server 150 to check for new patches that have not yet been installed in client 110A. Alternatively, update agent 214 may operate in an automatic fashion, periodically obtaining patches without requiring a user of client 110A to take any action to initiate the update process.

In the embodiment illustrated, client 110A includes a quarantine agent 210A. Quarantine agent 210A gathers information concerning the status of client 110A and provides this status information as statement of health 230 to a quarantine agent 210B operating within access server 112. Statement of health 230 may contain any information necessary or desirable for quarantine agent 210B to determine whether client 110A has a health that entitles it to access managed network 120 in accordance with the quarantine enforcement policy.

In the example shown in FIG. 2, a modular architecture is employed. Multiple system health agents (SHA) 216A, 216B, and 216C are illustrated. Each SHA obtains a specific type of status information. For example, one SHA may obtain status information concerning firewall software while another SHA may obtain information about antispyware software. Yet a further SHA may obtain information about the patch status of operating system software within client 110A.

Status information obtained by each SHA is passed through security center 212. Security center 212 aggregates status information and provides it to quarantine agent 210A. In this way, status information may be obtained about any protective software within client 110A by incorporating an SHA designed to obtain status information from or about that protective software.

Server 112 also includes a modular architecture that is adapted to respond to the request for access. Server 112 includes quarantine agent 210B that receives statement of health 230 from client 110A. Server 112 may include one or more statement of health verifiers (SHV), each processing a portion of the information contained within statement 230. In some embodiments, server 112 will include an SHV corresponding to each SHA in client 110A. In the example of FIG. 2, SHV 226A, 226B, and 226C are shown. However, the software within client 110A and server 112B may be modularized in any suitable fashion, and there is no requirement that each SHV correspond to an SHA.

Each SHV may determine that client 110A is not entitled to access to the network because it does not comply with the quarantine enforcement policy for one or more reasons. These determinations may include an indication of the reasons why client 110A does not qualify for access. The determination made by the SHV is provided to quarantine agent 210B. Quarantine agent 210B aggregates the outputs from all of the SHVs and generates a response indicating whether client 110A qualifies for access in accordance with the quarantine enforcement policy. The decision may be provided by quarantine agent 210B to other software within access server 112 that manages access to managed network 120 according to conventional access control techniques.

In addition, quarantine agent 210B generates a statement of health response 232 that is sent to quarantine agent 210A within client 110A. If the quarantine agent 210B determines that the client 110A is not entitled to access, statement of health response 232 may convey remediation information to client 110A. The remediation information may be in any suitable form and may be used by client 110A to automatically take remediation actions or to provide information for manual action by a human user of client 110A. In some embodiments, the remediation information will be customized to address the specific problems that caused client 110A to be quarantined.

In one embodiment, remediation information is provided in a statement of health response 232 as an address indicating where within computer system 100 client 110A may obtain further information concerning remediation. In some embodiments, that address information may be in the form of a URL pointing to a server or a specific page in a server. In situations where client 110A needs to download new software to comply with the quarantine enforcement policy administered by access server 112, a URL within statement of health response 232 may identify a specific page within update server 150 where client 110A may download needed updates.

Quarantine agent 210B may select the URL provided in statement of health response 232 based on the specific problems detected by an SHV 226A, 226B or 226C. By using an address selected based on a specific problem to obtain remediation information, client 110A may quickly become compliant with the quarantine enforcement policy.

In other embodiments, client 110A may not contain an update agent such as update agent 214 and may be unable to automatically download updates for protective software. Alternatively, the problem barring client 110A from access to managed 120 may not be a lack of up-to-date software. For example, the problem may be, an improper configuration of protective software within client 110A. In such situations, automatic download of software updates is either not possible or does not correct the problem. When quarantine agent 210B detect such a situation, it may provide a URL in statement of health response 232 that allows the problem with client 110A to be corrected without downloads from update server 150. The URL may identify a page on policy server 124 that contains instructions or other information in human-readable form. In response to receiving such a URL, quarantine agent 210A may access information on policy server 124 and display it for a human user. A human user may then manually, by following the instructions contained within the displayed information, remediate client 110A.

Additionally, quarantine agent 210B may provide quarantine agent 210A with remediation information in other forms. Quarantine agent 210B may provide a "script" containing a block of computer-executable instructions that may run on client 110A to remediate client 110A. The script may be downloaded from server 112 to client 110A. Alternatively, quarantine agent 210B may provide a script to client 110A by providing a URL or other network address identifying a location where quarantine agent 210A may obtain the script.

Regardless of the specific form in which remediation information is provided from access server 112 to client 110A, the remediation information may be used to quickly and easily remediate client 110A.

Figure 3:
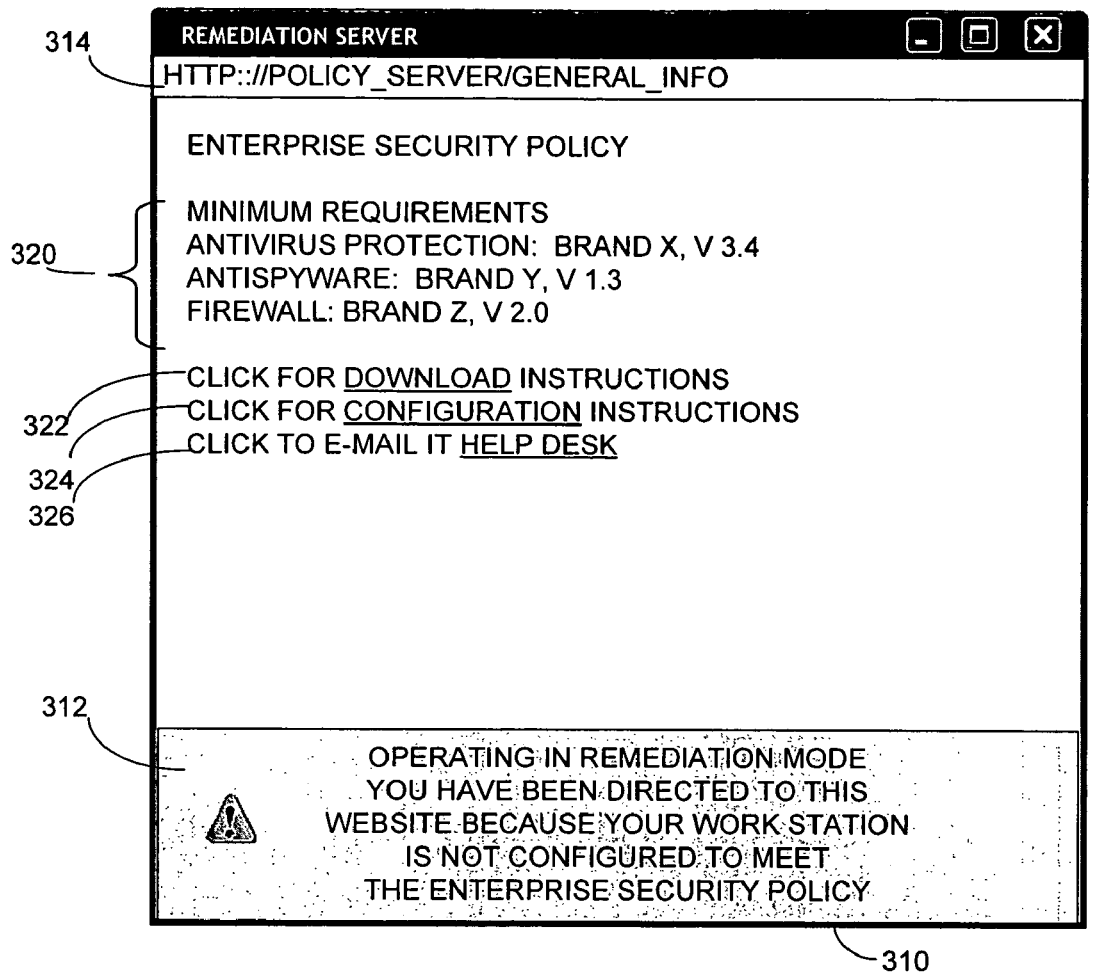
FIG. 3 is a sketch of a user interface presented to a user of a client directed to a remediation server in accordance with an embodiment of the invention.

As one example of a manner in which remediation may be simplified, FIG. 3 shows a graphical user interface 310 that may be displayed to a user of client 110A when client 110A is quarantined. Graphical user interface 310 may be presented by any suitable software executing within client 110A. In the illustrated embodiment, graphical user interface 310 is provided by a web browser (not shown). The web browser may be accessed by quarantine agent 210A (FIG. 2) upon receipt of a statement of health response containing a URL from which information to display to a human may be downloaded.

In the example illustrated in FIG. 3, the URL contained within statement of health response 232 points to a general information page on policy server 124. Accordingly, the address of the general information page appears in address field 314 of graphical user interface 310.

Though graphical user interface 310 is intended to provide information for a human user, several types of information are displayed. Banner field 312 contains a message, alerting a human user of client 110A that client 110A has been quarantined and is operating in a remediation mode. Banner 312 also informs the user that the client 110A has been automatically connected to a web site.

Field 320 provides information about the quarantine enforcement policy in use by network 120. In this example, information in field 320 identifies the minimum requirements for a client to comply with the quarantine enforcement policy. As pictured in FIG. 3, field 320 describes antivirus protection software, antispyware protection software and firewall software required by the policy. Three requirements are shown for simplicity, but a policy may contain any number of requirements. Further, information on the requirements may be organized in any suitable fashion, including being presented as links to other pages.

Graphical user interface 310 may also contain other types of information that concerns the quarantine enforcement policy or how a user may remediate a client to comply with the policy. This information may likewise be presented in any suitable fashion, including as links to other pages.

Multiple examples of links to additional information are shown in FIG. 3. Link 322 connects a user to another page where instructions for downloading software updates are available. Link 324 connects a user to another page where information on how to configure protective software is available. Link 326 opens a mail program, allowing a user to send an email message to a help desk for support in remediating client 110A. Links and other types of controls may be implemented with conventional user interface technology. Such controls are often activated by a human user manipulating a mouse or other pointing device to position a cursor over the control. When a button or other input mechanism on the mouse is activated or "clicked" by the human user, a function associated with the control is executed.

In a conventional implementation of a control, a programmer associates software with each control when the user interface is defined. Operating system utilities process input signals generated by a mouse or other input device to correlate mechanical: motion with locations on the graphical user interface. Upon receipt of a "click," the operating system utilities may invoke the software corresponding to a selected control. However, any suitable method of obtaining user input may be employed.

Figure 4:
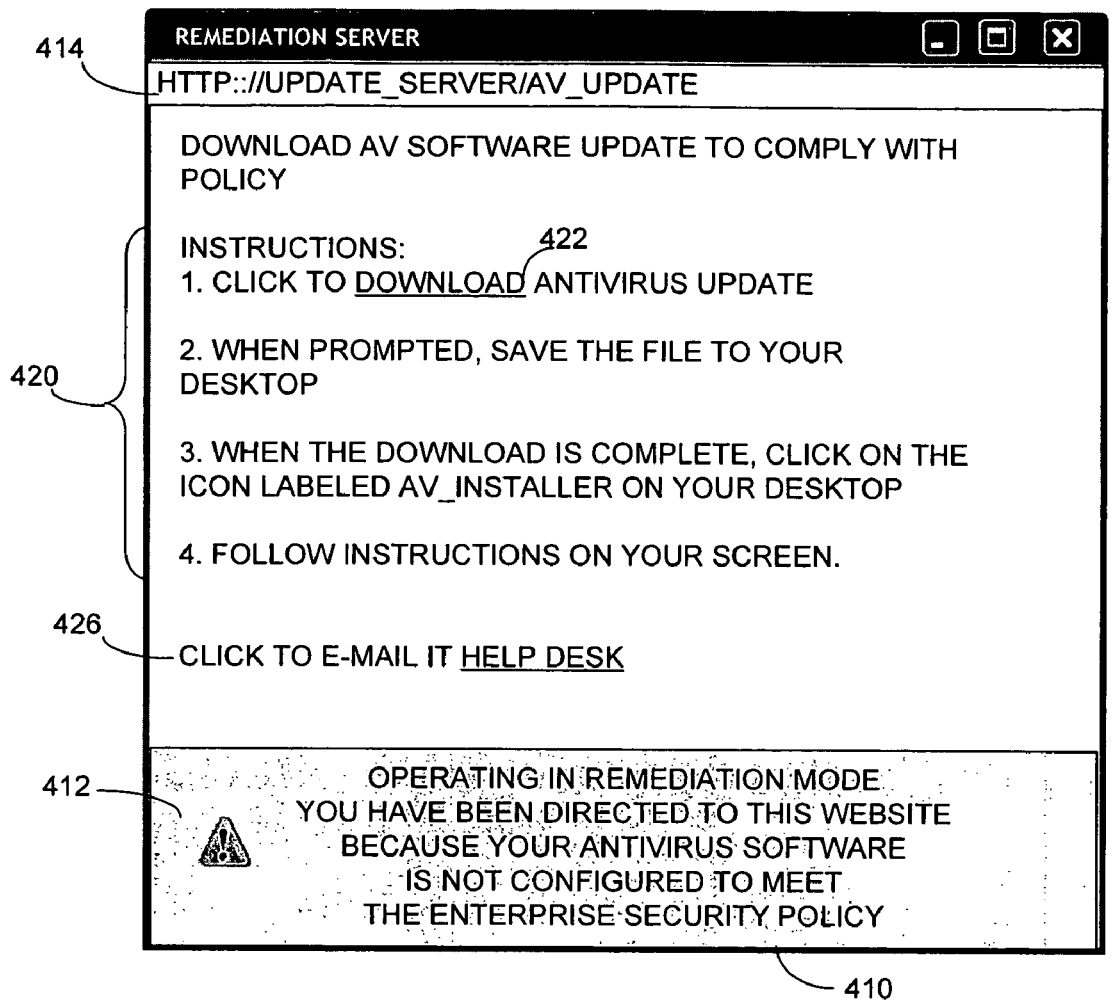
FIG. 4 is a sketch of a user interface presented to a user of a client directed to a remediation server according to an alternative embodiment of the invention.

As another example of a simplified remediation process, FIG. 4 shows a graphical user interface 410 that may be displayed to a human user when client 110A is quarantined for having out-of-date antivirus software. In the embodiment illustrated in FIG. 4, antivirus software is updated using human intervention. Accordingly, the graphical user interface 410 may be displayed on a display associated with client 110A.

Graphical user interface 410 may be generated by a web browser or other suitable display software within client 110A. Information for display through graphical user interface 410 may be downloaded from a network address specified in statement of health response 232.

In the example illustrated, graphical user interface 410 includes an address field 414. As shown, address field 414 displays the address of an antivirus update page on an update server. The URL identifying the antivirus update page displayed in address field 414 may be selected by quarantine agent 210B in response to a determination by one of the SHVs 226A . . . 226C that client 110A has out-of-date antivirus software. As demonstrated by this example, the information displayed for a human user through graphical user interface 410 may be focused on remediating the problem blocking client 410A from being granted access to managed network 120.

Banner 412 communicates to the user that client 110A has been quarantined and it is operating in a remediation mode. Banner 412 also notifies the user that client 110A needs to be remediated by downloading updated antivirus software.

Download instructions 420 provide information useful to the human user to perform the required update. As shown, download instructions 420 include a link 422 that the user can access to download an antivirus software update. Different or additional controls may be presented to the user as part of download instructions 420 to simplify remediation of client 110A.

Other information useful to a user remediating client 110A may be presented through graphical user interface 410. For example, graphical user interface 410 includes a link 426 accessing an email program to allow the human user to send an email requesting assistance.

Figure 5:
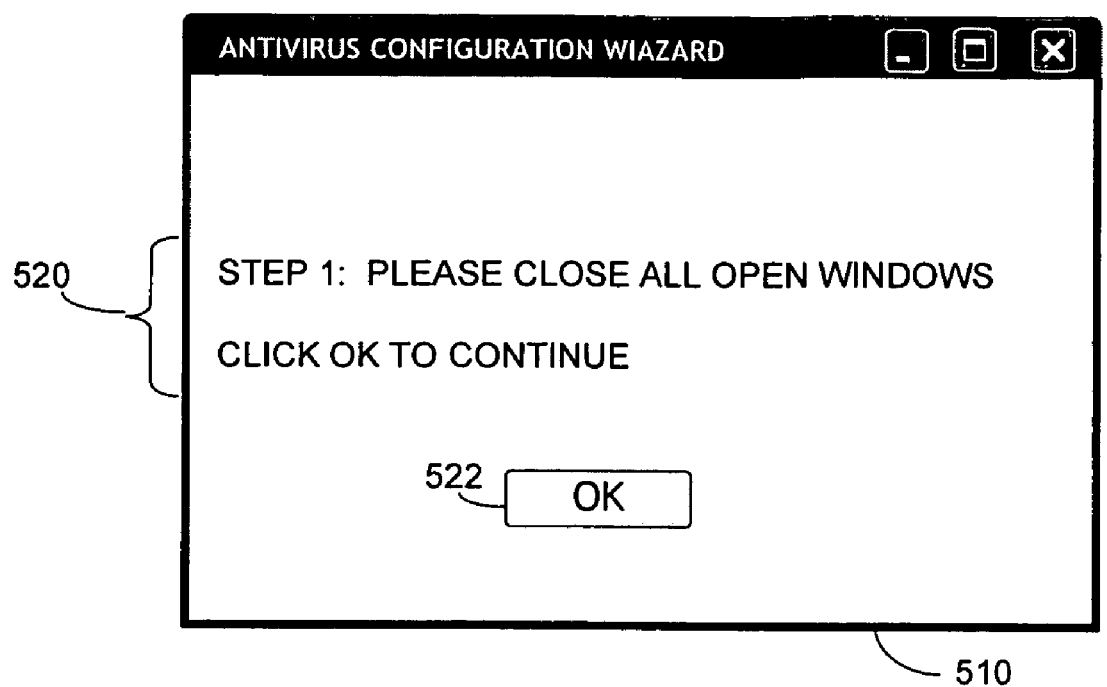
FIG. 5 is a sketch of a user interface displayed to a user of a quarantined client according to a further alternative embodiment of the invention.

In other embodiments, remediation information may be obtained from sources other than a web page and may be displayed by software other than web browser. In the embodiment of FIG. 5, remediation information is made available at client 110A through a script. In the embodiment illustrated in FIG. 5, the script provides an antivirus configuration wizard when executed. Such a script may be provided to client 110A in response to an SHV within access server 112 determining that client 110A does not meet the quarantine enforcement policy because its antivirus software is, mis-configured. The script may be communicated to client 110A in any suitable form. It may be downloaded from access server 112 as an executable file. As another example, access server 112 may communicate a URL or other address indicating where the script may be obtained. This URL may be communicated in conjunction with a code indicating to quarantine agent 210A to execute the script when obtained.

Regardless of the manner in which the script is identified to client 110A and obtained by client 110A, once obtained, the script is executed. In the example of FIG. 5, upon execution, the script displays a series of dialogue boxes guiding a human user through the process of configuring antivirus software to comply with the quarantine enforcement policy of managed network 120.

In the operating state pictured in FIG. 5, a dialogue box 510 is shown. Dialogue box 510 illustrates the first step in the configuration process. Dialogue box 510 provides instructions 520. Dialogue box 510 also presents a control 522 to a human user. In the embodiment illustrated, control 522 is a conventional box-type control that may be clicked to activate. However, any suitable format for obtaining control inputs from a user may be employed.

Dialogue box 510 may represent one dialogue box in a series of dialogue boxes presented as a script executes. Each dialogue box may display information and instructions for a human user. The script may sequence the series of dialogue boxes to ensure that the information and instructions are presented to the human user in an appropriate sequence at the appropriate times.

Figure 6:
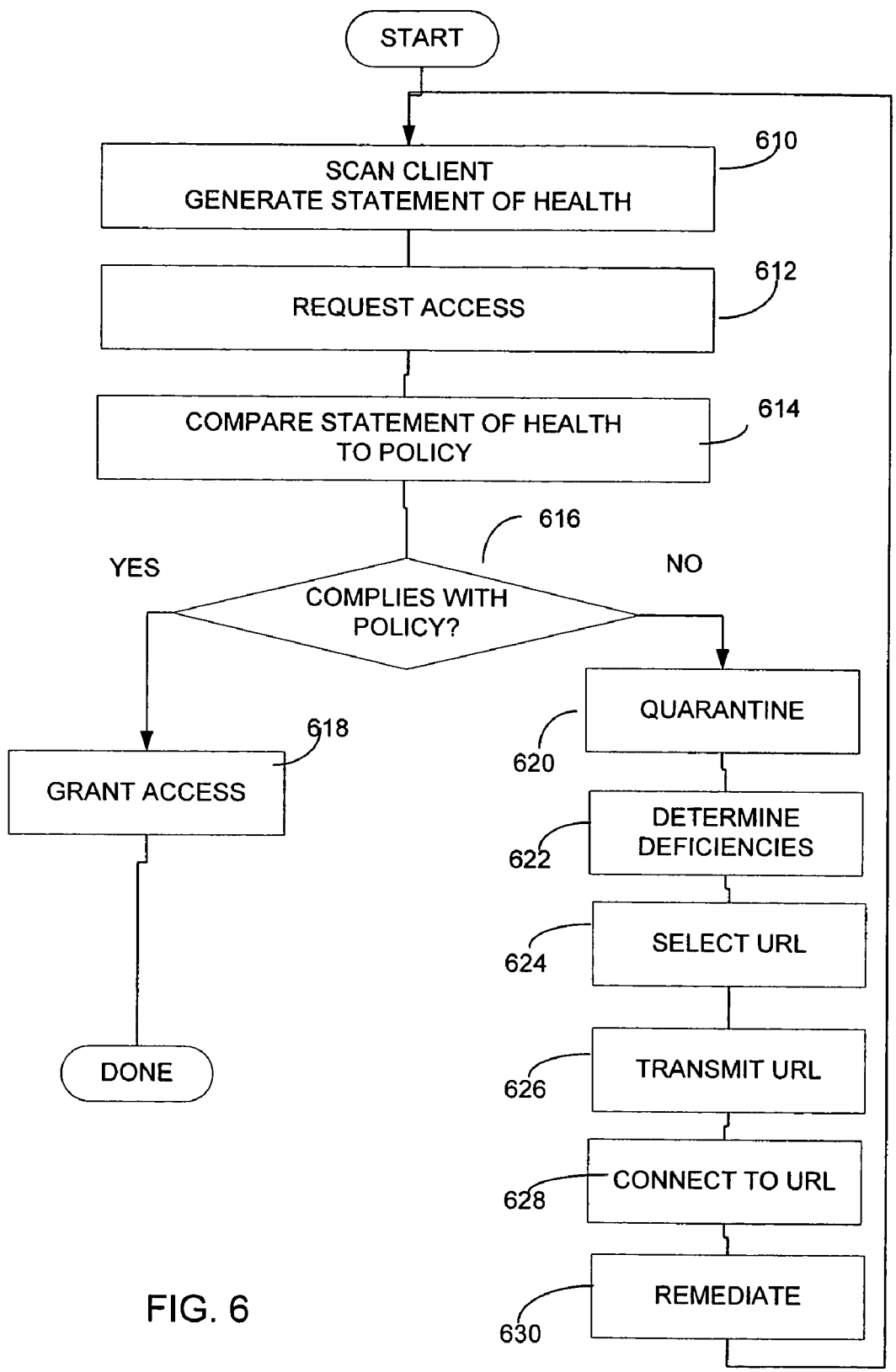
FIG. 6 is a flowchart illustrating operation of a computer system according to an embodiment of the invention.

Turning now to FIG. 6, a flow chart of a network management process is shown. The process begins at block 610. At block 610, a client seeking access to a managed network is scanned to determine status information about the protective software in the client. In the embodiment illustrated in FIG. 4, the processing at block 610 is performed by SHAs within client 110A. However, any suitable method of obtaining status information about a client may be employed. Regardless of the manner in which status information is obtained, the status information is used to generate a statement of health about the client.

At block 612, the client requests access to the managed network. The request for access includes the statement of health generated at block 610. In the embodiment pictured in FIG. 1, the request for access is directed to access point 116, where it is routed to an access control server 112. The statement of health generated at block 610 is transmitted to the access control server in conjunction with the request for access.

At block 614, the statement of health for a client requesting access is compared to a quarantine enforcement policy of the managed network for which the client requests access. The results of this comparison are used at decision block 616.

If the client requesting access has a status that complies with the quarantine enforcement policy, the processing branches at decision block 616 to block 618. At block 618, the client is granted access. The grant of access may be performed by access control server 112 and may be performed in any suitable fashion. For example, access may be granted by supplying the client with a network address or other code such that messages sent to or from the client will be routed within the network. Regardless of the manner in which network access is granted, once access is granted, the process of FIG. 6 is complete.

Alternatively, when it is determined at decision block 616, that the client does not comply with the policy, the process branches to block 620. At block 620, the client is quarantined. Any suitable method of quarantining, the client may be used. For example, a quarantine may be implemented by not providing the client with an address or other access codes needed to communicate with devices on the network. Alternatively, the quarantine may be implemented by providing the client with addresses or other codes allowing messages to be exchanged with the client and only specific network devices. As discussed above, some devices within the managed network may play a role in the remediation process. In such an embodiment, the quarantine implemented at block 620 is a limited quarantine, allowing the client requesting access to communicate only with those devices used as part of the remediation process.

At block 622, problems preventing the client from complying with the quarantine enforcement policy are determined. Embodiments are described above in which the problems are identified by processing the statement of health generated by the client. Information used to determine problems may alternatively or additionally come from other sources. For example, information concerning problems about a client may be obtained from an update server that tacks updates provided to each client.

Regardless of the manner in which the problems with a client requesting access are identified, processing proceeds to block 624. At block 624, an address identifying remediation information that addresses the identified problems is selected. This address may be selected from a table mapping rules that form a portion of the quarantine enforcement policy to addresses that contain information on how a client may comply with the rule. In such an embodiment, a URL may be selected at block 624 by identifying a specific policy rule that the client requesting access has failed and performing a table lookup. However, any suitable method of selecting an address defining remediation information may be used.

At block 626, the URL identifying remediation information is transmitted to the client. In embodiments described above, this URL is transmitted to the client as part of the statement of health response 232 (FIG. 2). However, any suitable method of transmitting the URL may be used.

At block 628, the client uses the selected URL to access the specified remediation information. In embodiments described above, remediation information is obtained by download from a web page. However, any suitable method of obtaining remediation information may be employed.

Once the remediation information is obtained, the information is used to remediate the client at block 630. The specific actions taken may depend on the type of information obtained. The remediation information may be of a type that guides a human user through the remediation process. In such an embodiment, the remediation process at block 630 involves display of the remediation information. Alternatively, the remediation information may be an identification of an update that needs to be downloaded and installed on the client. In such an embodiment, the remediation process at block 630 may involve automated action that may occur without user interaction.

Regardless of the specific form in which remediation occurs, once the client is remediated, the process may return to block 610 where the process is repeated. If the remediation at block 630 is successful, when the process of FIG. 6 is repeated, it should branch at decision 616 to block 618 where the client is granted access. Alternatively, if the remediation at block 630 is not successful, the process may be repeated one or more times until remediation is either successful or determined to require intervention by a human user or network administrator.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Accordingly, the foregoing description and drawings are by way of example only.

The above-described embodiments of the present invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Also, the various methods or processes outlined herein may be coded as software that is executable on one or more processors that employ any one of a variety of operating systems or platforms. Additionally, such software may be written using any of a number of suitable programming languages and/or conventional programming or scripting tools, and also may be compiled as executable machine language code or intermediate code that is executed on a framework or virtual machine.

In this respect, the invention may be embodied as a computer readable medium (or multiple computer readable media) (e.g., a computer memory, one or more floppy discs, compact discs, optical discs, magnetic tapes, etc.) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A computer-implemented method of operating a computer system according to a quarantine enforcement policy, the computer system having a client, a first server and a second server, the method comprising:
   determining, by the client, at least two statuses selected from a group including a status of antivirus software executing on the client, a status of antispyware software executing on the client, a status of firewall software executing on the client, and a status of patches of operating system software on the client,
   aggregating, by the client computer, the determined at least two statuses,
   sending from the client to the first server a request for access to a managed network, the request for access comprising status information including information about the aggregated at least two statuses concerning the client;
   receiving at the client a communication from the first server, the communication including information for displaying to a user, the information including information regarding the quarantine enforcement policy and a first link capable of being activated by the user to cause instructions for downloading to be displayed to the user, the information regarding the quarantine enforcement policy including information regarding one or more aspects of the quarantine enforcement policy with which at least one of the at least two statuses is not in compliance, wherein, when the quarantine enforcement policy allows a quarantined client restricted access to the managed network, receiving at the client the communication from the first server notifies the client that the client is granted restricted access to the managed network for a period of time;
   displaying, by the client to the user, the information included in the communication from the first server; and
   using an address of the second server included in the communication from the first server, in response to the user activating the first link, to download computer-executable instructions or data to qualify the client for access to the managed network in accordance with the quarantine enforcement policy, wherein when the client is granted restricted access and the client does not qualify for access to the managed network in accordance with the quarantine enforcement policy by the end of the period of time, the restricted access is revoked.

2. The computer-implemented method of claim 1, further comprising:
   receiving, from the user, input controlling a modification of a configuration of protective software within the client.

3. The computer-implemented method of claim 1, wherein using the address of the second server to download computer-executable instructions or data further comprises downloading a computer-executable script.

4. The computer-implemented method of claim 3, wherein the method further comprises:
   executing the script; and
   receiving user input as the script executes.

5. The computer-implemented method of claim 1, wherein using the address of the second server to download computer-executable instructions or data further comprises accessing the second server to download a software update.

6. The computer-implemented method of claim 5, further comprising:
   installing the software update; and
   sending from the client to the first server a second request for access to the managed network, the second request for access comprising second status information concerning the client, the second status information reflecting the installed software update.

7. A computer-readable medium adapted for use on a client computer, the computer-readable medium having computer-executable instructions for performing steps comprising:
   determining, by each one of a plurality of agents executing on the client computer, a respective specific type of status information;
   aggregating, on the client computer, the respective specific types of status information;
   generating, by the client computer, a request for access to a network implementing a quarantine enforcement policy, the request for access including information on the aggregated respective specific types of status information of the client computer;
   receiving, by the client computer, a response to the request for access, the response including an aspect of the quarantine enforcement policy with which at least one of the respective types of status information is not in compliance, wherein, when the quarantine enforcement policy allows a quarantined client restricted access to the network, receiving, by the client computer, the response notifies the client computer that the client computer is granted restricted access to the network for a period of time; and
   performing, by the client computer, a remediation action, the remediation action selected based on information in the response, and the remediation action comprising using remediation information communicated in conjunction with the response to do at least one of:
   i) automatically obtain updates for protective software;
   ii) display information to a human user; and
   iii) obtain a computer-executable script,
   wherein when the client computer is granted restricted access and the client computer does not qualify for access to the network by the end of the period of time, the restricted access is revoked.

8. The computer-readable medium of claim 7, wherein the computer executable instructions further comprise a web browser and performing a remediation action comprises displaying information obtained from a web page specified in the remediation information to a human user using the web browser.

9. The computer-readable medium of claim 8, wherein displaying information obtained from the web page comprises displaying a link to at least one fourth web page.

10. The computer-readable medium of claim 8, wherein displaying information obtained from the web page comprises displaying information describing the quarantine enforcement policy.

11. The computer-readable medium of claim 7, wherein performing a remediation action comprises selectively displaying information to a human user when automatic updates for the client computer cannot be obtained.

12. A computer-implemented method of operating a computer system according to a quarantine enforcement policy, the computer system having a client, a first server and a second server, the method comprising:

receiving, at the first server, status information originating from the client, the status information including information about at least two statuses selected from a group including a status of antivirus software executing on the client, a status of antispyware software executing on the client, a status of firewall software executing on the client, and a status of patches of operating system software within the client;

determining, at the first server, whether the client complies with the quarantine enforcement policy;

when the client does not comply with the quarantine enforcement policy, identifying, at the first server, a reason why the client does not comply with the quarantine enforcement policy and, when the quarantine enforcement policy allows a quarantined client restricted access to a managed network, granting to the client restricted access to a managed network for a period of time; and using, by the first server, the identified reason to select an address of remediation information from a table mapping a rule that forms a portion of the quarantine enforcement policy to an address that includes information on how a client can comply with the rule; and sending, by the first server, the selected address to the client wherein when the client is granted restricted access and the client does not comply with the quarantine enforcement policy by the end of the period of time, the restricted access is revoked.

13. The computer-implemented method of claim 12, wherein the first server is an access control server and receiving status information comprises receiving status information in conjunction with a request for access.

14. The computer-implemented method of claim 12, further comprising, when the first server determines that the client complies with the quarantine enforcement policy, the first server grants the client access to a managed network.

15. The computer-implemented method of claim 14, wherein:

sending the address of remediation information comprises sending a URL of a server within the managed network, and the method further comprises granting the client limited access to the managed network.

16. The computer-implemented method of claim 14, wherein sending the selected address comprises sending a URL for a server outside the managed network.

17. The computer-implemented method of claim 12, further comprising:

at the client, downloading software updates using the selected address.

18. The computer-implemented method of claim 12, further comprising:

at the client, downloading information describing the quarantine enforcement policy using the selected address.

19. The computer-implemented method of claim 1, wherein:

the information included in the communication from the first server includes a second link capable of being activated by the user for requesting assistance via an email message.

20. The computer-readable medium of claim 7, wherein determining a respective specific type of status information further comprises:

determining, by the client computer, at least two statuses selected from a group including a status of antivirus software executing on the client computer, a status of antispyware software executing on the client computer, a status of firewall software executing on the client computer, and a status of patches of operating system software within the client computer.

* * * * *